(12) United States Patent
Reyes

(10) Patent No.: US 8,141,465 B2
(45) Date of Patent: Mar. 27, 2012

(54) WIRE BUNDLE WRAP CUTTING TOOL

(75) Inventor: Reynaldo P. Reyes, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 577 days.

(21) Appl. No.: 12/371,978

(22) Filed: Feb. 17, 2009

(65) Prior Publication Data

US 2010/0206148 A1    Aug. 19, 2010

(51) Int. Cl.
 *B26B 13/26* (2006.01)
(52) U.S. Cl. .................. 83/13; 30/241; 30/278; 30/290
(58) Field of Classification Search .................. 30/241, 30/242, 243, 194, 182–185, 290, 272.1, 273, 30/278, 282, 92, 124; 83/13
See application file for complete search history.

(56) References Cited

U.S. PATENT DOCUMENTS

| | | | | |
|---|---|---|---|---|
| 46,797 A | * | 3/1865 | Harris | 30/242 |
| 938,831 A | * | 11/1909 | Deane | 30/244 |
| 1,786,625 A | | 8/1929 | Lindstrom et al. | |
| 1,805,864 A | * | 5/1931 | Benzel | 30/198 |
| 2,075,341 A | | 3/1937 | Goodman | |
| 2,385,419 A | | 9/1945 | Matulich | |
| 2,533,962 A | * | 12/1950 | Rowe et al. | 30/242 |
| 3,199,193 A | | 8/1965 | Norty | |
| 4,169,400 A | * | 10/1979 | Ducret | 83/409 |
| 5,261,163 A | * | 11/1993 | Shearhart | 30/242 |
| 5,533,262 A | | 7/1996 | Clark | |
| 5,711,078 A | | 1/1998 | Patton et al. | |
| 7,263,775 B2 | * | 9/2007 | Moulton, III | 30/29 |

\* cited by examiner

*Primary Examiner* — Stephen Choi
(74) *Attorney, Agent, or Firm* — Ostrager Chong Flaherty & Broitman P.C.

(57) ABSTRACT

In accordance with a preferred embodiment of the present disclosure, a wire bundle wrap cutter is provided for cutting wire bundle wraps. The wire bundle wrap cutter generally comprises a shaft with a cutting end, and a handle end, a cutting head perpendicular to the cutting end, and a handle with a trigger at the handle end. The cutting head defines a channel between a tongue and a blade enclosure. There is a cutting blade disposed in a slot in the blade enclosure which is movable from an enclosed position wherein the cutting edge is inside the blade enclosure to an activated position wherein the cutting edge is moved toward the tongue portion to cut a wire bundle wrap placed in the U-shaped channel.

16 Claims, 9 Drawing Sheets

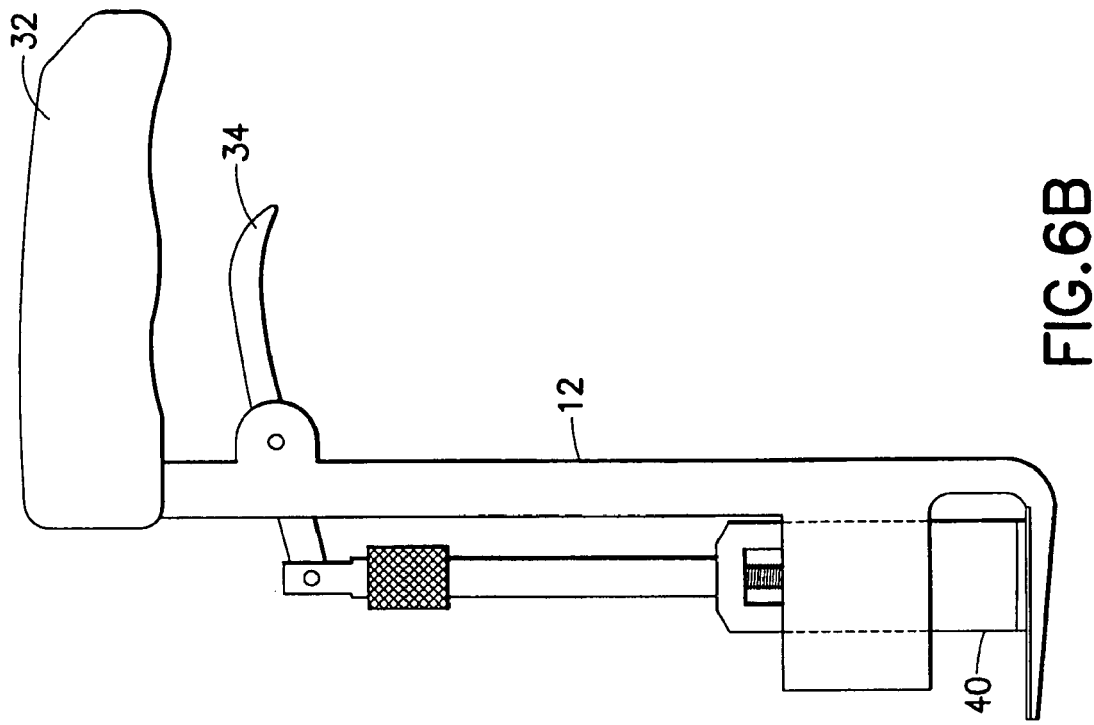
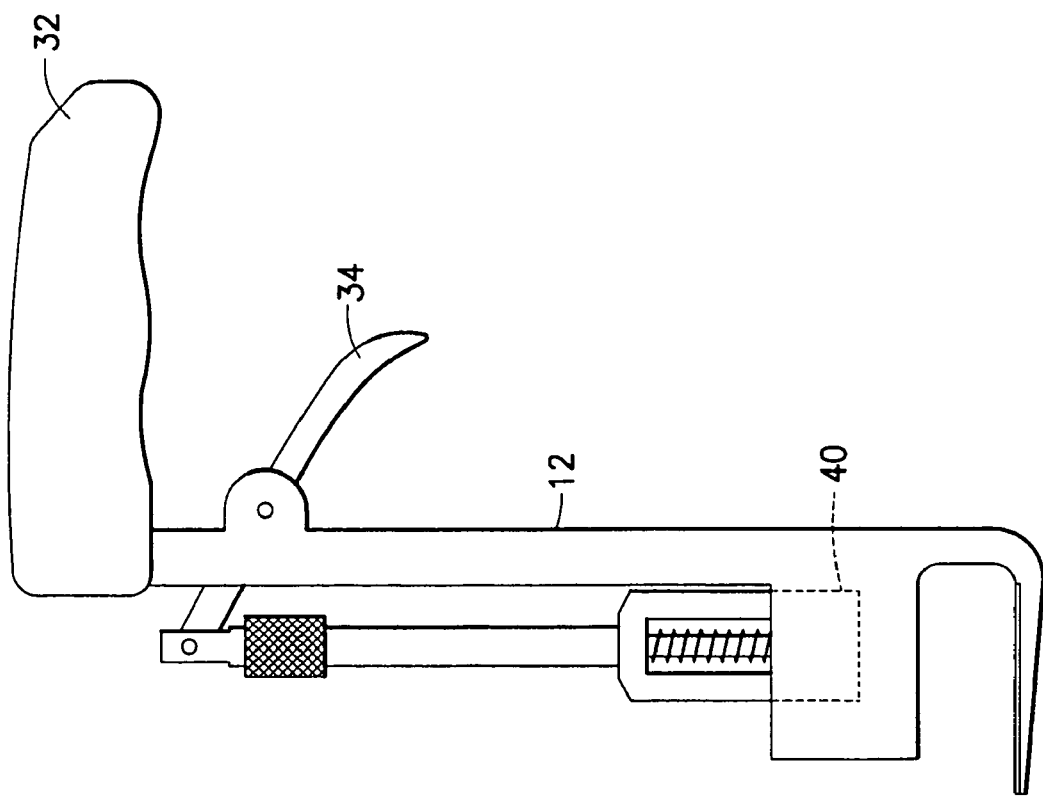

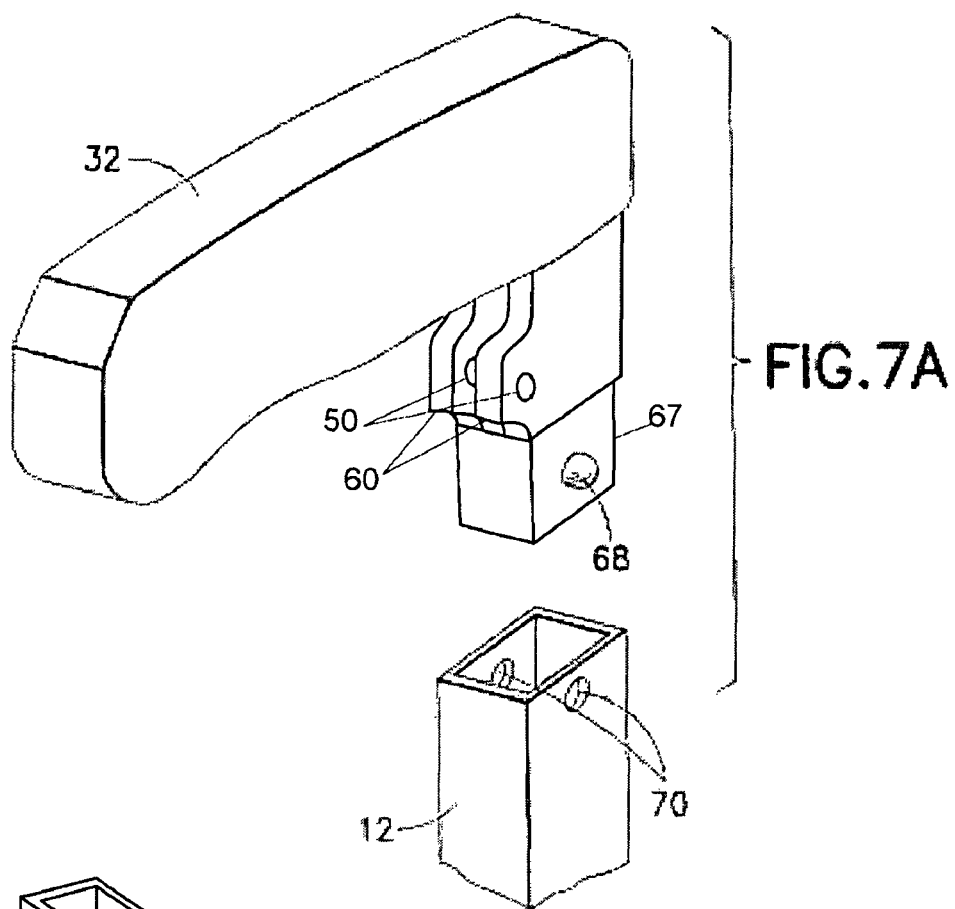
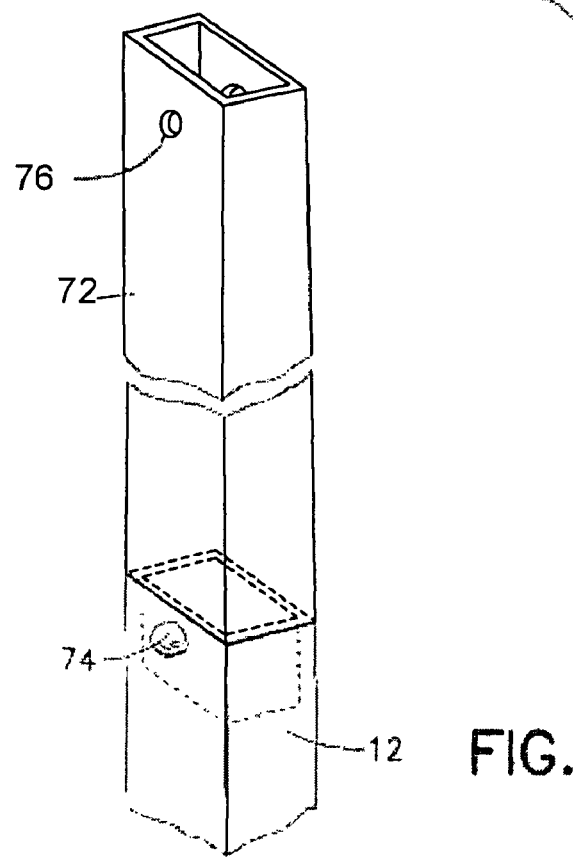

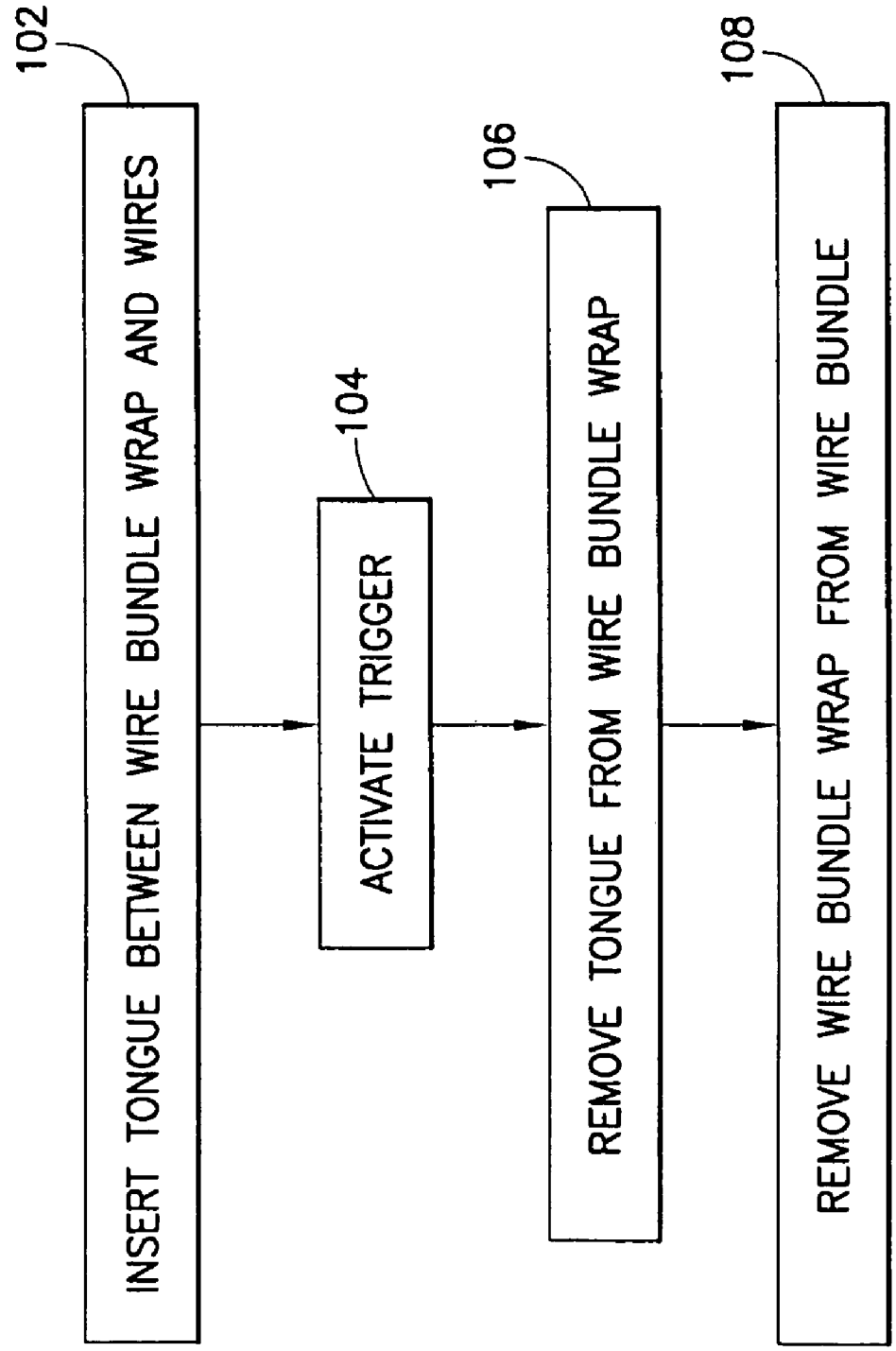

WIRE BUNDLE WRAP CUTTING TOOL

TECHNICAL FIELD

The disclosure generally relates to a device for electrical servicing, and particularly to an improved cutting device for cutting wire bundle wraps.

BACKGROUND

In many different applications, electrical wiring may be extensively utilized. For example, in an airplane, wires must run between various parts of the plane to provide power, signaling, and other capabilities. For organization and tidiness, wiring is grouped together in bundles and secured through different means. One of such means is through the use of wire bundle wraps, commonly referred to as "panduit," which may used to retain groups of individual wires into bundles. For maintenance or other reasons, wire bundles and wire bundle wraps may need to be serviced or reworked, which may require that the wire bundle wraps are cut.

Many types of cutting devices may be used to cut wire bundle wraps. However, existing tools make such work difficult, in the sense that wires in the wire bundle may accidentally cut and work in hard-to-reach areas is very difficult to accomplish. Using existing cutting tools requires extra care and time when reworking a wire bundle, especially in hard-to-reach and poorly lit areas.

Thus there is a need for an improved wire bundle wrap cutting tool which allows for safe and easy cutting of wire bundle wraps, convenient access to hard-to-reach areas, and which does not damage wires.

SUMMARY

In accordance with a preferred embodiment of the present disclosure, a wire bundle wrap cutter is provided comprising a shaft, a cutting end, and a handle end, a cutting head extending in a transverse direction from a top side of the cutting end, the cutting head comprising a generally U-shaped channel defined by a tongue portion and a blade enclosure for receiving a wire bundle wrap to be cut; a cutting blade having a cutting edge, wherein the cutting blade is disposed in a slot in the blade enclosure, the slot being disposed in a direction perpendicular to the shaft, such that the cutting edge of the cutting blade is disposed in the direction perpendicular to the shaft; the cutting blade being movable from an enclosed position wherein the cutting edge is inside the blade enclosure to an activated position wherein the cutting edge is moved toward the tongue portion to cut a wire bundle wrap placed in the U-shaped channel.

The wire bundle wrap cutter may be activated by a handle with a trigger disposed at the handle end of the cutter. Preferably, the trigger pushes a push rod disposed along the length of the shaft and coupled to the cutting blade, to cause a cutting action by forcing the cutting blade out of the blade enclosure and towards the tongue.

The blade enclosure prevents any sharp edges from being exposed when the trigger is not activated, ensuring that surrounding wires and other objects are safe from accidentally being cut. The tongue prevents wires in wire bundles from being cut.

An LED or other light source may be coupled to the cutting end of the cutter, so that illumination may be provided for unlit areas.

An extendable shank may be provided to improve accessibility to hard-to-reach areas.

Other objects, features, and advantages of the preferred embodiments will be explained in the following detailed description with reference to the appended drawings.

BRIEF DESCRIPTION OF DRAWINGS

FIGS. 6A and 6B are side views of the cutting tool, respectively in a read position and an activated position.

FIG. 7A depicts a removable handle with trigger mechanism that may be used with the cutting tool, in a removed state.

FIG. 7B depicts an extendable shank that may be attached to the shaft of the cutting tool.

FIG. 10 is a flow diagram for a preferred method of utilizing the cutting tool to cut wire bundle wraps.

DETAILED DESCRIPTION

In the following detailed description, certain preferred embodiments are described as illustrations in a specific application environment in order to provide a thorough understanding of the present disclosure. Those methods, procedures, components, or functions which are commonly known to persons of ordinary skill in the field of the disclosure are not described in detail so as not to unnecessarily obscure a concise description of the present disclosure. Certain specific embodiments or examples are given for purposes of illustration only, and it will be recognized by one skilled in the art that the teachings of this disclosure may be practiced in other analogous applications or environments and/or with other analogous or equivalent variations of the illustrative embodiments.

Figure 1:
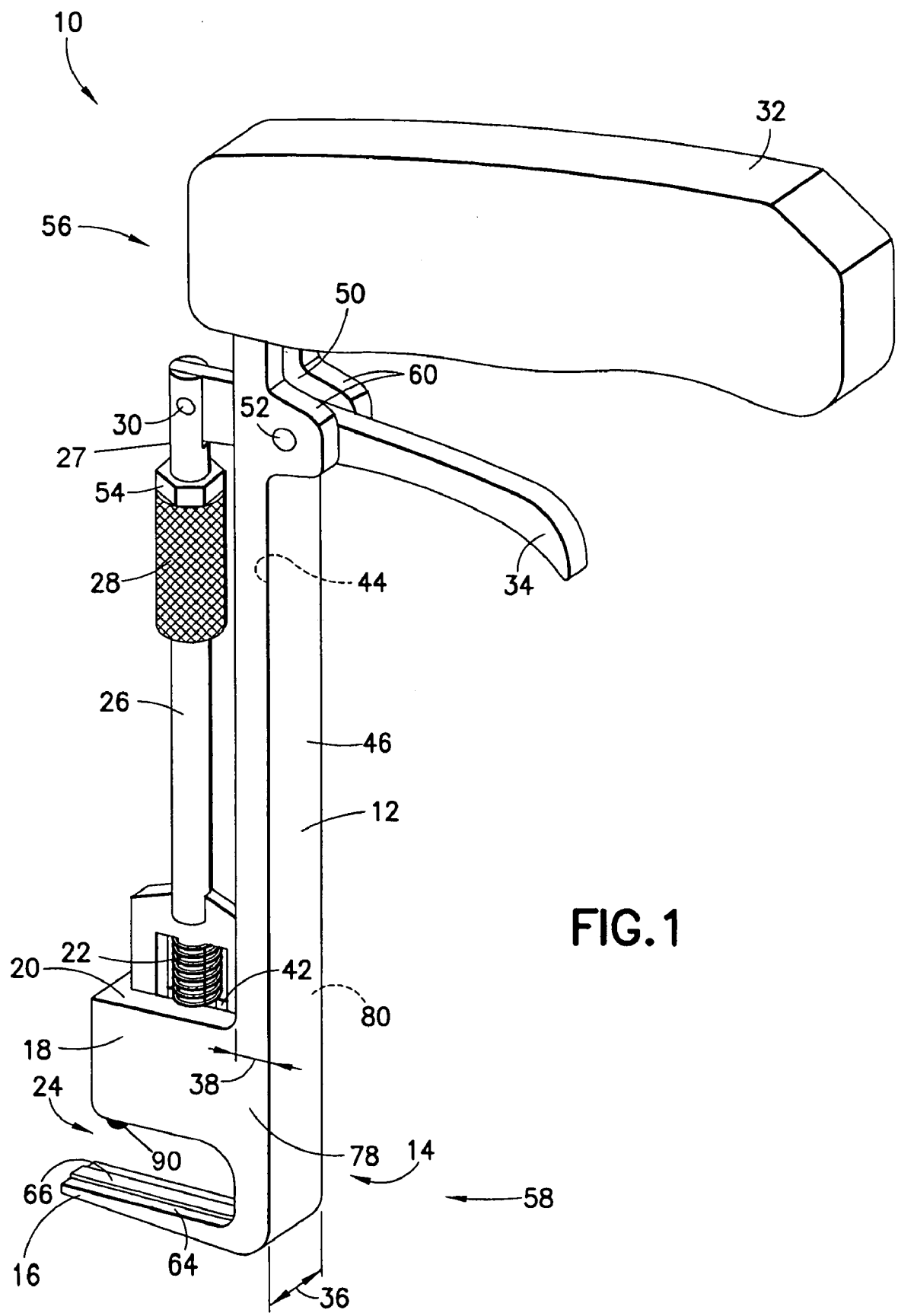
FIG. 1 is a left side perspective view of a first preferred embodiment of a cutting tool for cutting wire bundle wraps.
Figure 8:
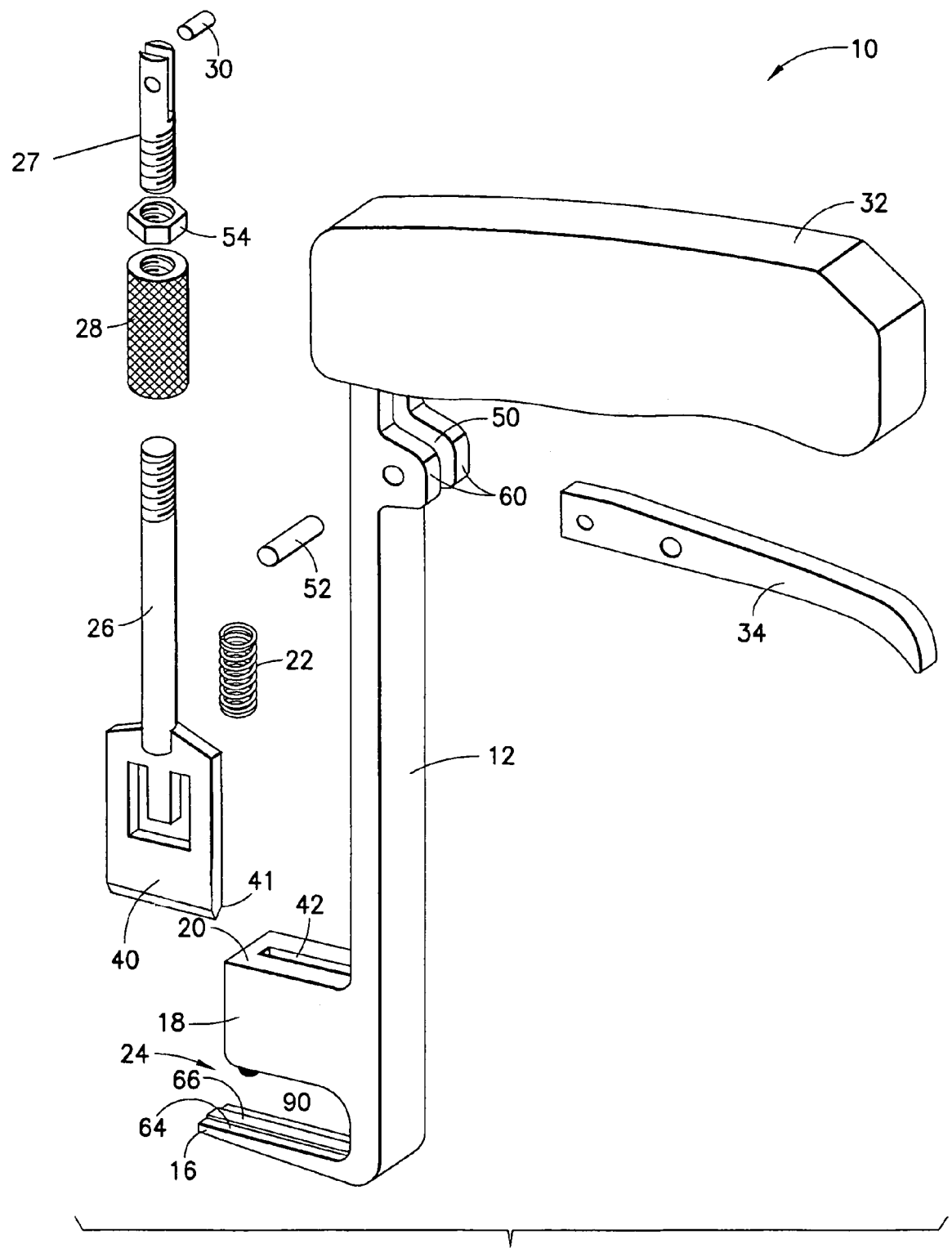
FIG. 8 is an exploded view of the cutting tool shown in FIG. 1.

In a preferred embodiment of a wire wrap cutter depicted in FIG. 1, also shown in exploded view in FIG. 8, the cutter has a handle end 56, a cutting end 58 and a shaft 12. A handle 32 and a trigger 34 are located at the handle end 56, and a cutting blade 40 inside a blade enclosure 18 is located at the cutting end 58. The blade 40 is preferably square shaped, meaning that the blade 40 is a straight edge from one end to the other, but may also be rectangular in shape, be slanted, or have a curved edge. The shaft 12 may be cylindrical, rectangular, or any other shape that allows a trigger 34 at one end to activate a blade 40 at the other end.

Figure 2:
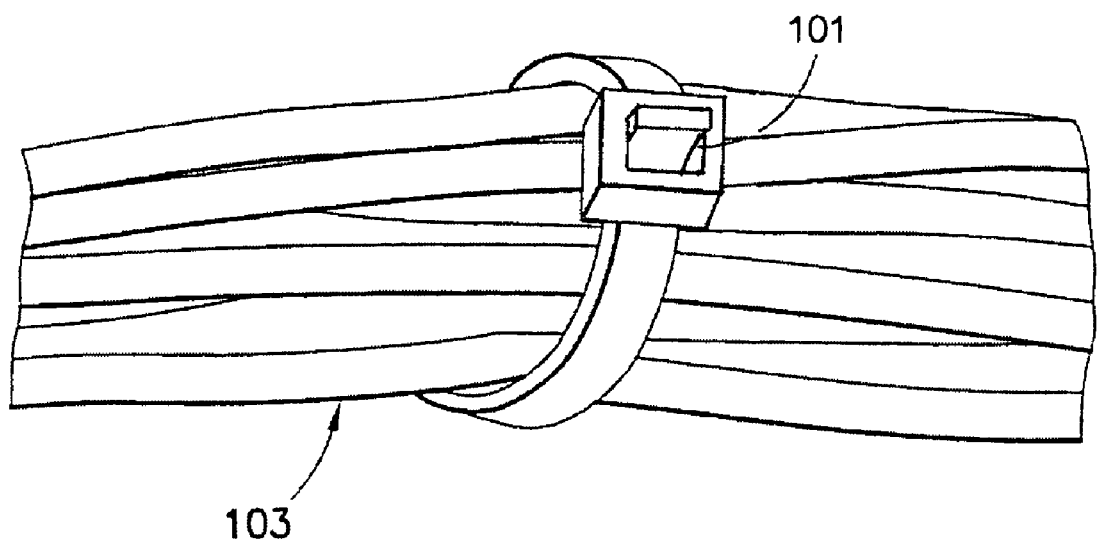
FIG. 2 depicts a wire bundle and wire bundle wrap of the type that may be cut with the cutting tool shown in FIG. 1.

A cutting head is located at the cutting end, and comprises a generally U-shaped channel 24 defined by a tongue portion 16 and a blade enclosure 18 for receiving a wire bundle wrap to be cut; a cutting blade 40 having a cutting edge 41, wherein the cutting blade is disposed in a slot 42 in the blade enclosure 18, the slot 42 being disposed in a direction generally perpendicular to the shaft 12, such that the cutting edge of the cutting blade is disposed in the direction generally perpendicular to the shaft. The shaft 12 has a rectangular cross-section, and has a top side 44 and a bottom side 46, a left side 78 and a right side 80. Preferably, the shaft has a width 36 and a depth 38 wherein the width is approximately equal to the depth and the width is approximately 0.4". The blade may be activated by a handle such that it is moved towards the tongue 16. FIG. 2 depicts a wire bundle 103 and a wire bundle wrap 101 to be cut by the cutter 10.

The trigger 34 activates the blade 40 by pushing a push rod 26 disposed along the top side 44 of the shaft 12, which in turn pushes the blade 40 towards the tongue 16. The blade 40 and the trigger 34 may both be coupled to the push rod 26, such that activation of the trigger 34 creates a cutting motion in the blade 40.

The connection mechanism between the trigger and the push rod may be an axle 30 which serves to rotatably couple the trigger to the push rod stub 27 and push rod 26. The trigger may be disposed through a hole 50 in the shaft 12 at the handle end 56, emerging on the bottom side 46. At the bottom side 46, may be another axle 52 disposed through holes defined by a pair of flanges 60 attached to the shaft 12, wherein the axle 52 serves to rotatably couple the trigger 34 to the shaft 12.

Figure 9:
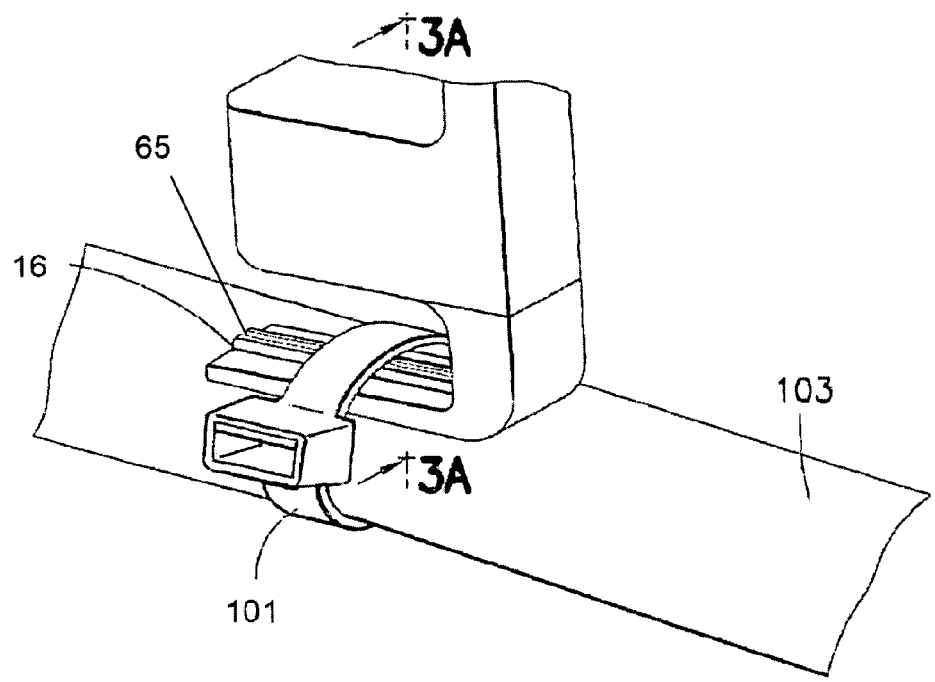
FIG. 9 depicts the cutting tool in use to cut a wire bundle.
Figure 12:
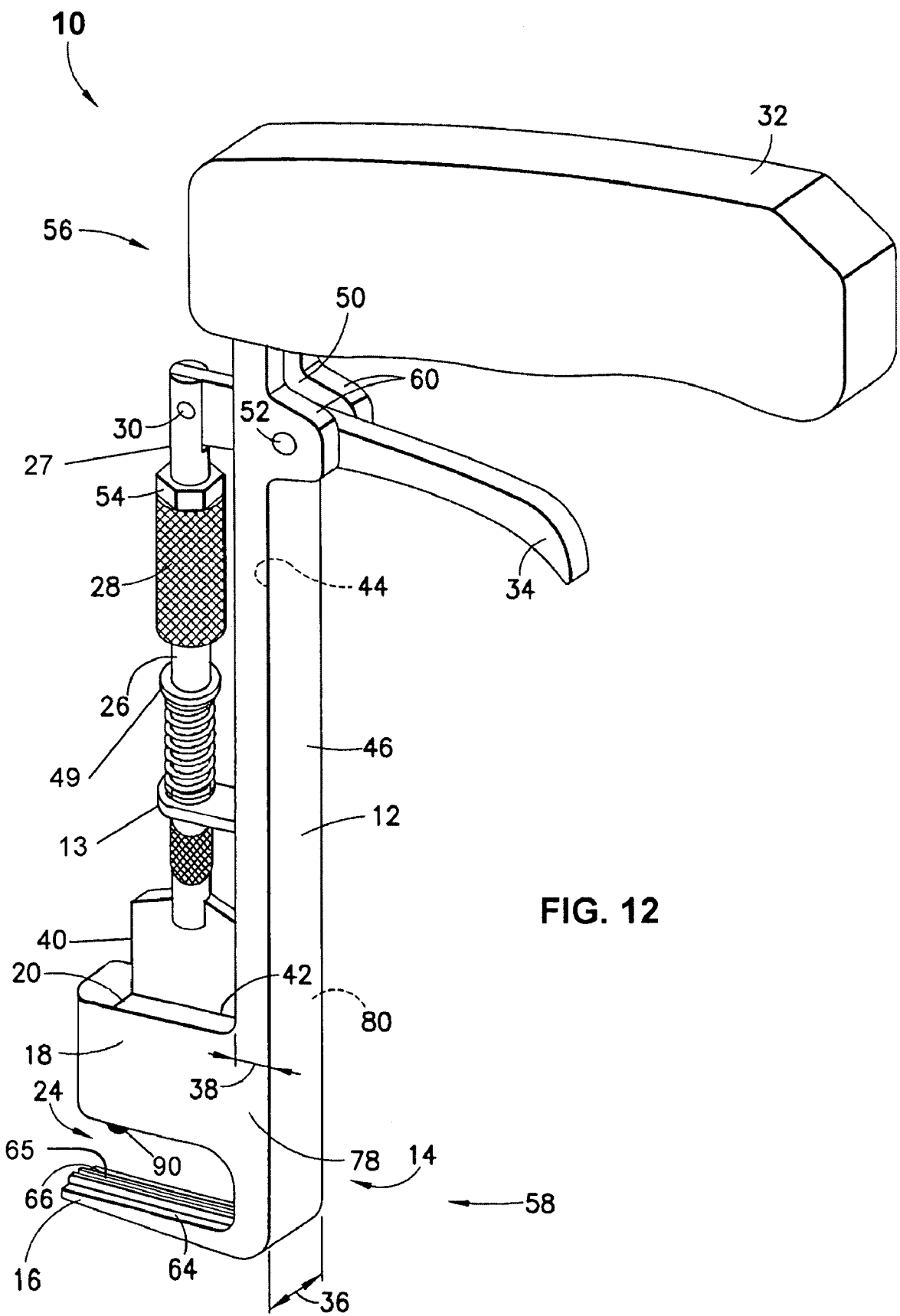
FIG. 12 depicts an alternate embodiment of a cutting device employing the alternate push rod shown in FIG. 4.

At the far end of the shaft may be a cutting head 14. Preferably, the cutting head 14 comprises a thin tongue 16, and a blade enclosure 18 which together define a U-shaped channel 24. The thin tongue portion 16 preferably comprises a thin flat section 64 with a raised portion 66 in the middle. The raised portion may optionally have a slit 65 in the middle for receiving a blade as shown in FIGS. 9 and 12. The thin tongue 16 has a connected end, which is connected to the shaft, and a tip end, which helps define the entry point of the U-shaped channel.

Preferably, the width of the tongue 16 remains the same along its length. The width of the tongue 16 helps prevent the tongue 16 from slipping between gaps in the wires and accidentally engaging wires, as the tip of the tongue 16 is designed to be wider than the diameter of the wires and the gaps in between the wires. Additionally, the thin tongue 16 is preferably wedge-shaped, wherein the height of the tongue portion decreases towards the tip end.

Figure 4:
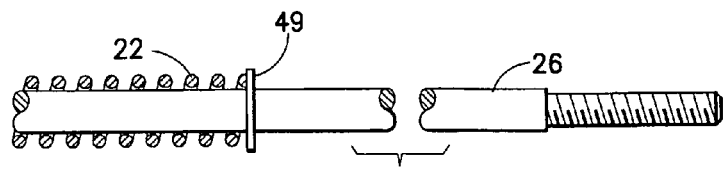
FIG. 4 depicts an alternate push rod that may be used with the cutting tool shown in FIG. 1.

The blade 40 is preferably disposed through a slit 42 in the blade enclosure 18 such that the blade 40 is hidden within the blade enclosure 18 and attached to the push rod 26. The blade 40 is retained in an inactivated position by a spring 22. The portion of the blade 40 which is attached to the push rod 26 may define a hole in which a return spring 22 is located. Alternatively, the spring 22 may be between a stop washer 49 and a flange 13. The return spring 22 presses against both the blade enclosure 18 and against the blade 40 and functions to retain the blade 40 in a retracted position until the trigger 34 is activated, and to return the blade 40 to a retracted position after the trigger 34 is released. In an alternate embodiment depicted in FIG. 4, the return spring 22 is disposed against a washer 49 connected to the push rod 26. The embodiment of the push rod shown in FIG. 4 is shown in the context of the cutter in FIG. 12. Preferably, when the blade 40 is in a retracted position, no portion of the blade 40 is exposed within the U-shaped channel 24, so that the blade 40 cannot accidentally cut anything.

Figure 5:
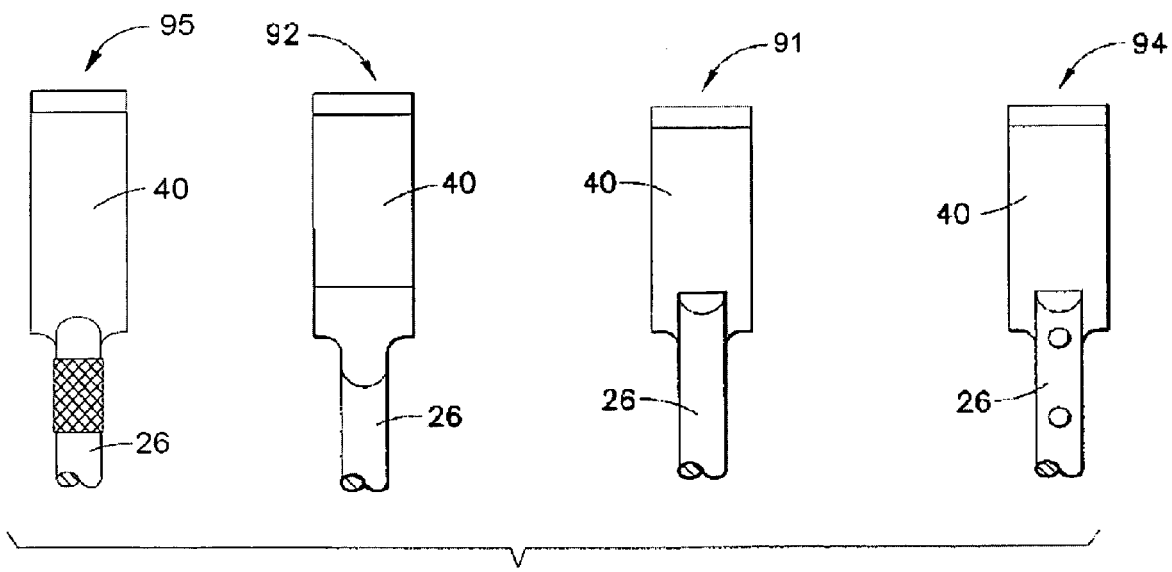
FIG. 5 depicts alternate embodiments with which to attach the blade to the push rod.

FIG. 5 depicts alternate methods by which the blade 40 may be attached to the push rod 26. The push rod 26 is preferably attached to the blade 40 via a base weld, as in embodiment 91. In a first alternate embodiment 92, the push rod 26 may be initially manufactured with a blade at the end of it. In a second alternate embodiment 94, the push rod 26 may be bolted to the blade 26. In a third alternate embodiment 95, a wedge type attachment attaches the blade to the push rod.

Figure 11:
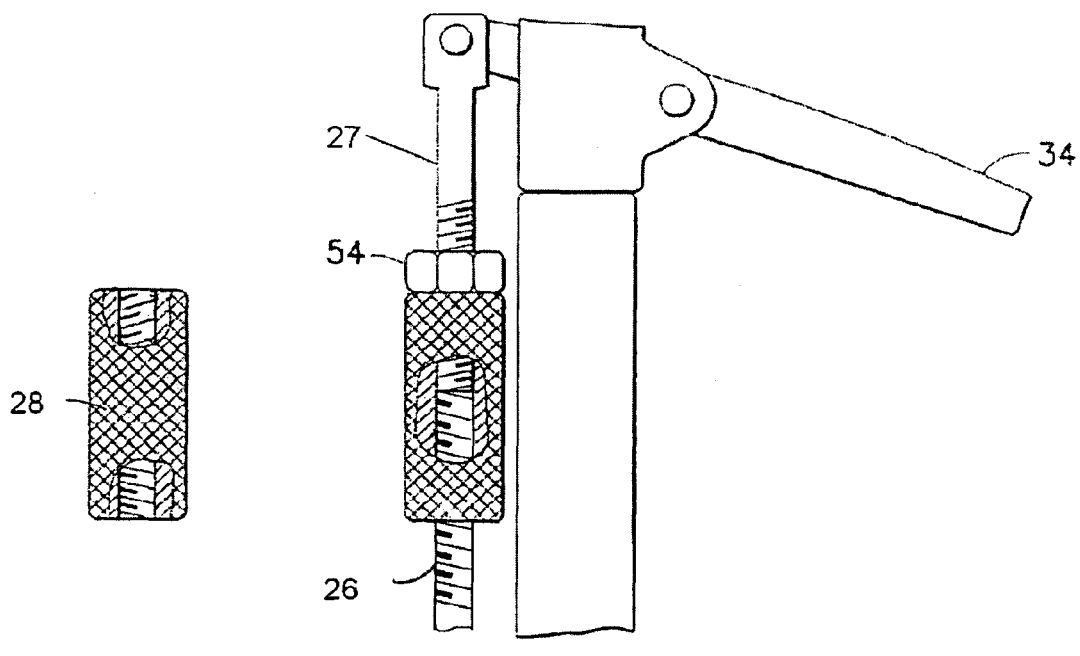
FIG. 11 depicts a locking mechanism that may be used with the cutting tool shown in FIG. 1.

Referring again to FIG. 1, a turn buckle 28 serves to fine-tune the position of the blade 40. Rotating the turn buckle 28 in one direction slowly pushes the blade 40 towards the cutting end 58, while rotating the turn buckle 28 in the other direction slowly retracts the blade 40 back towards the handle end 56. As depicted in detail in FIG. 11, a locking mechanism 54 locks the turn buckle 28 in place once the blade 40 is in a desired position. As also shown in FIG. 11, the locking mechanism 54 is preferably a nut, operating to retain the push rod 26 in a desired position. The turn buckle 28 has right hand threads towards the handle end and left hand threads towards the cutting end, such that rotation of the turn buckle in one direction pushes the push rod 26 and push rod stub 27 outwards, while rotation in the other direction pushes the push rod 26 and push rod stub 27 inwards. Optionally, the threading of the turn buckle 28 may be reversed such that the turn buckle 28 has left hand threads towards the handle end and right hand threads towards the cutting end. Preferably, the turn buckle 28 is cylindrical and has a knurling texture on its outside surface, but may be any other shape. A locking mechanism 54 may be provided towards the handle end which can be tightened against the turn buckle to lock it in place. The locking mechanism 54 may be a nut or other appropriate device.

A light source, such as an LED 90, may be attached to the blade enclosure 18, in order to provide illumination in poorly lit areas. It should be appreciated that many types of light sources may be used for such a purpose.

Figure 3:
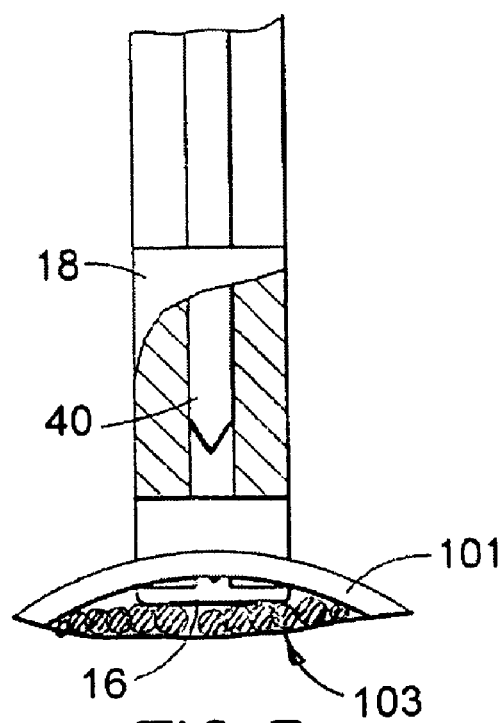
FIG. 3 depicts a cross-sectional view of a cutting head of the cutting tool with a wire bundle wrap in place for cutting taken along lines 3A-3A of FIG. 9.

Referring to FIGS. 3 and 9, FIG. 9 depicts a cutter cutting a wire bundle wrap and FIG. 3 depicts a cross-sectional view taken along lines 3A-3A of the cutting tool 10. The thin tongue 16 is shown at the bottom of the drawing. The blade 40 is shown disposed through slit 42 and adjacent to the spring 22.

FIGS. 6A and 6B depict activation of the trigger mechanism. In FIG. 6A, the device 10 is shown in an inactivated position. In this position, the force from the return spring 22 acts to retain the blade 40 and push rod 26 away from the blade enclosure 18. This in turn retains the trigger 34 in a released, inactive position. In FIG. 6B, the device 10 is shown in an activated position. When the trigger 34 is activated, the push rod 26 and push rod stub 27 are pushed towards the blade enclosure 18, which in turn pushes the blade 40 in the same direction. This causes a cutting motion which can be used to cut wire bundle wraps.

As it is desirable to reach hard to reach areas, the cutter may support an extendable length feature. FIG. 7A depicts a close up of the handle end 56 with the handle 32 and trigger 34 removed. Optionally, the handle 32, with trigger 34 may be selectively attachable to the shaft 12 by two depressible prongs 68 which fit into depressions 70 on the inside of the shaft 12.

In FIG. 7B, an extendable shank 72 is shown attached to the shaft 12. The shank has shank protrusions 74 which fit into the depressions 70 on the shaft 12. The shank 72 also has shank depressions 76 which fit over the prongs 68 on the handle 32.

In FIGS. 9 and 10, a method 100 is shown for using the tool to cut a wire bundle wrap 101 for holding a wire bundle 103. In step 102, the tongue 16 of the cutting device 10 is inserted between the wire bundle wrap 101 and the wire bundle. Optionally, a light such as an LED 90 may be switched on. Preferably, the tongue 16 is inserted in a direction generally perpendicular to the wire bundle wrap 101 and generally parallel to the wires 103, such that the wires 103 cannot be cut. Further, it should be assured that when the tongue 16 is inserted, no wires 103 are found within the U-shaped channel 24. In step 104, the trigger 34 is activated, which causes the blade 40 to cut the wire bundle wrap 101. In step 106, the tongue 16 is removed from the wire bundle wrap 101, and finally in step 108, the wire bundle wrap 101 is removed from around the wire bundle 103.

Many modifications and variations may of course be devised given the above description of the principles in this disclosure. It is intended that all such modifications and variations be considered as within the spirit and scope of this disclosure, as defined in the following claims.

I claim:

1. A wire bundle wrap cutting tool comprising:
a shaft having a cutting end and a handle end;
a cutting head extending in a transverse direction from a top side of the cutting end, the cutting head comprising a generally U-shaped channel, defined by a tongue portion and a blade enclosure, for receiving a wire bundle wrap;
a cutting blade having a cutting edge, wherein the cutting blade is disposed in the blade enclosure, such that the cutting blade and the cutting edge of the cutting blade are disposed in the direction perpendicular to the shaft;
the cutting blade being movable from an enclosed position wherein the cutting edge is inside the blade enclosure to an activated position wherein the cutting edge is moved toward the tongue portion to cut the wire bundle wrap placed in the U-shaped channel;
a handle on the handle end of the shaft, said handle being substantially perpendicular to said shaft;
a trigger on the handle end for operating the blade, said trigger positioned between said cutting end and said handle, said trigger being connected at a pivot to said shaft, said trigger being pivotable between an activated position in which the trigger is closer to said handle and an inactivated position in which the trigger is farther from said handle; and
a push rod disposed along a top side of the shaft, and coupled to the trigger and to the blade, such that activation of the trigger pushes the push rod and the blade towards the cutting end of the shaft, causing a cutting action.

2. The cutting tool of claim 1, wherein:
said tongue portion comprises a flat, lowered section and a central raised section; and
said tongue portion has a connected end connected to the shaft, and a tip end opposite the connected end.

3. The cutting tool of claim 2, wherein:
the height or width of the tongue portion decreases towards the tip end, such that the tongue portion is wedge-shaped and is able to easily slide under and lift a wire bundle wrap.

4. The cutting tool of claim 3, further comprising:
a turn buckle engaged with the middle of the push rod, wherein rotation of the turn buckle moves the push rod with respect to the cutting end.

5. The cutting tool of claim 1, wherein:
when the blade is in the enclosed position, no sharp edges are exposed outside of the blade enclosure.

6. The cutting tool of claim 1, wherein:
the cutting blade is rectangular.

7. A cutting tool, comprising:
a shaft having a cutting end and a handle end;
a cutting head extending in a transverse direction from a top side of the cutting end, the cutting head comprising a generally U-shaped channel defined by a tongue portion and a blade enclosure for receiving a wire bundle wrap;
a cutting blade having a cutting edge disposed in a slot in the blade enclosure, the slot being disposed in a direction perpendicular to the shaft, such that the cutting blade and the cutting edge of the cutting blade is disposed in the direction perpendicular to the shaft;
the cutting blade being movable from an enclosed position wherein the cutting edge is inside the blade enclosure to an activated position wherein the cutting edge is moved toward the tongue portion to cut the wire bundle wrap placed in the U-shaped channel;
the tongue portion comprising a substantially flat member having a blade receiving face perpendicular to the length of the shaft and facing the slot of the blade enclosure, the blade receiving face having a raised central section closer to the blade enclosure and two lowered peripheral sections surrounding the raised central section and farther from the blade enclosure, the raised central section positioned to receive the blade when the blade is in an activated position.

8. The cutting tool of claim 7, further comprising:
a handle on the handle end of the shaft;
a trigger disposed through the shaft, for operating the blade; and
a push rod disposed along the top side of the shaft, and coupled to the trigger and to the connecting portion of the blade, such that activation of the trigger pushes the push rod and the blade towards the cutting end of the shaft, causing a cutting action.

9. The cutting tool of claim 7, further comprising:
a flange extending from the shaft towards the push rod, wherein said flange defines a hole through which the push rod is disposed;
a stop washer coupled to and surrounding the push rod, wherein said stop washer is located between said handle end and said flange; and
a return spring disposed against the flange and against the stop washer such that said return spring retains the blade in an inactivated position when the trigger is not pressed.

10. The cutting tool of claim 7, further comprising:
a turn buckle engaged with the middle of the push rod, wherein rotation of the turn buckle moves the push rod with respect to the cutting end.

11. The cutting tool of claim 7, further comprising:
an extendable shank attachable to the shaft and to the handle, which functions to extend the length of the cutting tool to reach hard-to-reach areas.

12. The cutting tool of claim 7, wherein:
the central raised section on the tongue defines a slit for the blade to fit into when it is in an activated position.

13. The cutting tool of claim 7, wherein the blade is attached to the push rod by a wedge type attachment.

14. A method for cutting a wire bundle wrap comprising:
providing a cutter comprising:
a shaft having a cutting end and a handle end;
a cutting head extending in a transverse direction from a top side of the cutting end, the cutting head comprising a generally U-shaped channel defined by a tongue portion and a blade enclosure for receiving a wire bundle wrap;
a cutting blade having a cutting edge disposed in a slot in the blade enclosure, the slot being disposed in a direction perpendicular to the shaft, such that the cutting blade and the cutting edge of the cutting blade is disposed in the direction perpendicular to the shaft;

the cutting blade being movable from an enclosed position wherein the cutting edge is inside the blade enclosure to an activated position wherein the cutting edge is moved toward the tongue portion to cut the wire bundle wrap placed in the U-shaped channel;

the tongue portion comprising a substantially flat member having a blade receiving face perpendicular to the length of the shaft and facing the slot of the blade enclosure, the blade receiving face having a raised central section closer to the blade enclosure and two lowered peripheral sections surrounding the raised central section and farther from the blade enclosure, the raised central section positioned to receive the blade when the blade is in an activated position;

inserting said tongue portion between a bundle of wires and the wire bundle wrap in a direction generally perpendicular to the wire bundle wrap and generally parallel to the wires, such that the wires cannot be cut;

activating said trigger;

removing said tongue portion from the wire bundle wrap; and removing the wire bundle wrap from the wire bundle.

15. The method of claim 14, wherein inserting said tongue portion between said bundle of wires and the wire bundle wrap further comprises:

ensuring that the wire bundle wrap is completely within the U-shaped channel.

16. The method of claim 14, further comprising the step of:

switching on a light to improve visibility in a poorly lit area.

* * * * *